Aug. 23, 1960   R. F. BRENNEN ET AL   2,950,381
WELDING ELECTRODE FEEDING APPARATUS
Filed April 15, 1960   2 Sheets-Sheet 1
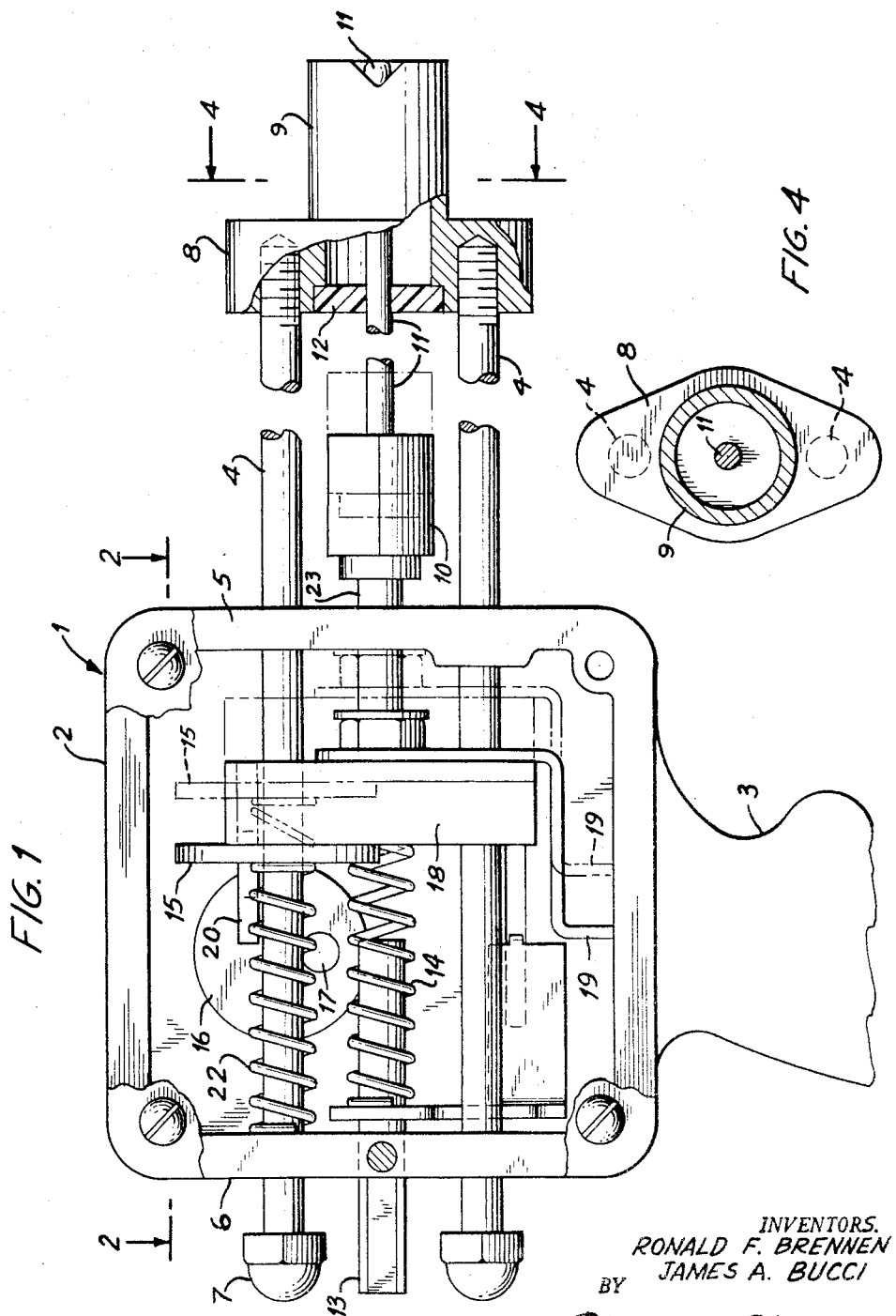
INVENTORS.
RONALD F. BRENNEN
JAMES A. BUCCI
BY
ATTORNEYS

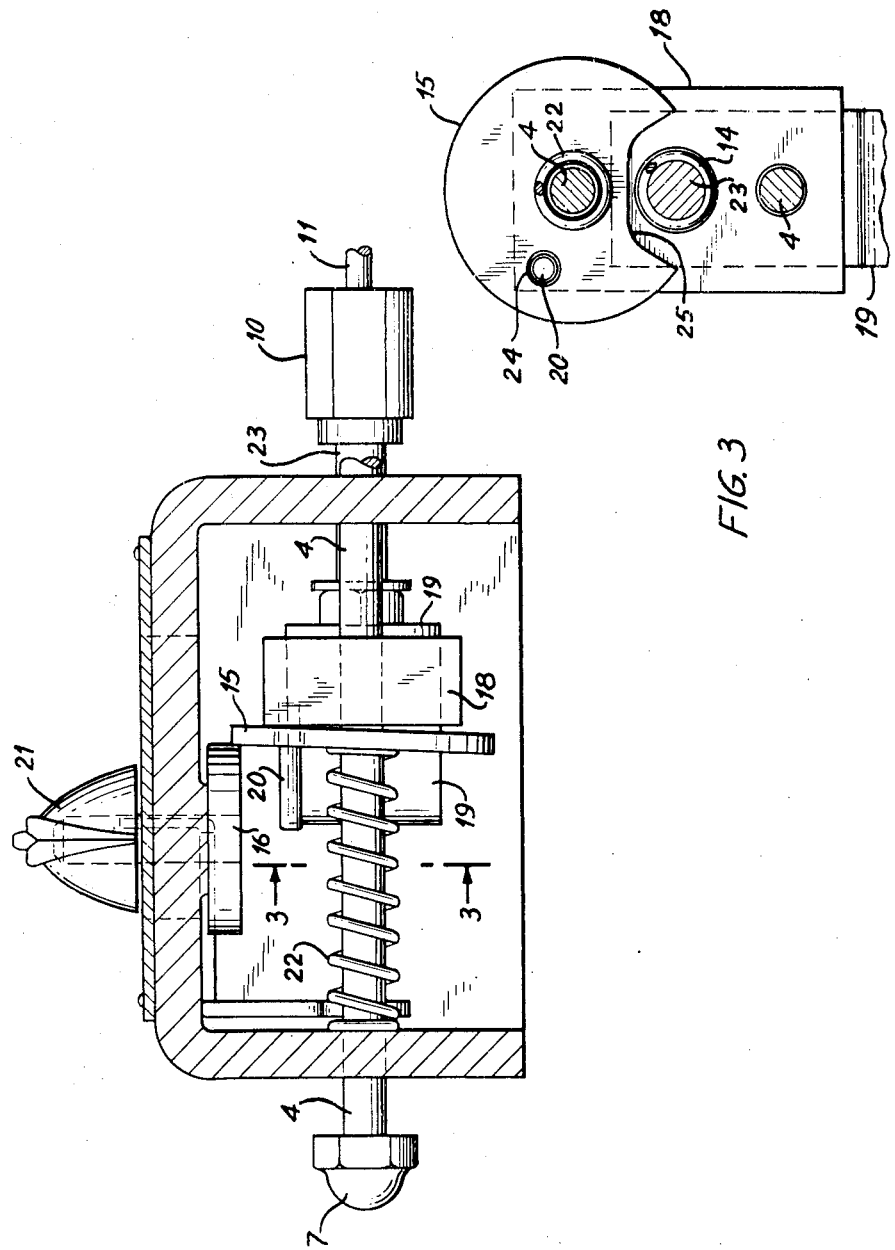

United States Patent Office 2,950,381
Patented Aug. 23, 1960

2,950,381

WELDING ELECTRODE FEEDING APPARATUS

Ronald F. Brennen, 964 E. 16th St., and James A. Bucci, 2360 McDonald Ave., both of Brooklyn, N.Y.

Filed Apr. 15, 1960, Ser. No. 22,641

8 Claims. (Cl. 219—127)

This invention relates to apparatus for feeding welding electrodes, more specifically to a means of presetting the amount of electrode to be fed.

As is well-known in the art, spot welding is a common method of securing elements of a whole together. Frequently in large scale production, a workman is called upon to make substantially the same spot weld again and again on successive units presented to him in an assembly line arrangement.

Under such circumstances it is very desirable to maintain a uniformity of weld and in particular a uniformity of metal deposited. Such uniformity depends upon the amount of electrode consumed during the welding operation, and in the absence of some controlling apparatus, must vary from weld to weld and from operator to operator.

It is therefore among the objects of this invention to provide an apparatus for feeding welding electrodes which is capable of presetting to determine the optimum quantity of deposited weld.

It is also among the objects of this invention to provide an apparatus for feeding welding electrodes, which once set will produce the same weld each cycle.

It is further among the objects of this invention to provide an apparatus for feeding welding electrodes which is simple to use.

It is still further among the objects of this invention to provide an apparatus for feeding welding electrodes which is of uncomplicated construction and therefore substantially fool-proof.

It is still further among the objects of this invention to provide an apparatus for feeding welding electrodes which is capable of presenting a measured amount of electrode automatically to the weld.

In practicing this invention, there is provided a casing having a handle or other means for gripping it. Slidable guide rods extend through the ends of the casing and within the casing an insulating block is slidably mounted on these rods. The electrode holder has one end secured to the block and extends through the end of the casing adjacent to and preferably between the guide rods. Means for urging the block toward the end of the casing through which the holder projects is provided, and in one form of the invention comprises a helical spring mounted between the block and the end of the casing opposite that through which the holder projects.

An adjustable stop means is mounted on the side of the casing and in the preferred embodiment of this invention takes the form of a cam which may be operated from the outside of the casing. On at least one of the guide rods is a slidably mounted stop means adapted to be contacted by the adjustable stop means. In one form of this invention, the slidable stop means is a disk urged towards the block by a spring or other means. This disk is retained in position by a pin which prevents rotation thereof and is loosely mounted on the rod so that when it contacts the adjustable stop means it assumes a biased angular position towards the rod. This locks the disk and prevents further movement of the guide rods until the release of the pressure on the rods.

At the ends of the guide rods at which the welding operation is to take place, there is provided at least one guide for an electrode. This guide may take the form of a substantially cylindrical member secured to both guide rods at the ends thereof and carrying an internal insulating cylinder with an axial hole therethrough, through which passes the electrode.

The operation of this device will be more readily understood with reference to the accompanying drawings which form a part hereof and in which like reference characters indicate like parts.

In said drawings—

Fig. 1 is a side view of the apparatus with one side of the casing broken away for clarity;

Fig. 2 is a sectional view along line 2—2 of Fig. 1;

Fig. 3 is a front view of the apparatus, and

Fig. 4 is a section along lines 4—4 of Fig. 1.

The apparatus 1 is composed of a casing 2 having a handle 3. Guide rods 4 pass through the ends 5 and 6 of casing 2 and terminate at the back in nuts 7. The opposite ends of rods 4 carry guide 8 which is provided with a cylindrical portion 9. Insulating disk 12 serves to prevent shorting out of the electrode 11. The electrode is mounted in electrode holder 10 by a screw or any other suitable means. The electrode holder is mounted on support 23 which in turn is secured to insulating block 18.

A base member 13 carrying holder spring 14 is mounted in end 6 of casing 2. The other end of holder spring 14 bears against insulating block 18.

On guide rod 4 is mounted slidable disk 15 which is provided with a hole 24 adapted to receive pin 20. Cutout portion 25 prevents disk 15 from interfering with the operation of holder spring 14 and pin 20 prevents rotation of disk 15 and maintains cut-out portion 25 in proper alinement with holder spring 14.

Cam 16 eccentrically pivoted at 17 is controlled by adjustment handle 21 from the outside of casing 2. Rod spring 22 serves to urge disk 15 against block 18.

To operate this device, electrode 11 is inserted through the opening in insulating disk 12 and secured to electrode holder 10. Guide rods 4 are slidably moved to their extreme right or forward position as shown in Fig. 1. The electrode 11 should then be flush with the end of cylinder 9 on insulated guide 8, as shown in full lines in Fig. 1.

Knob 21 is then turned, moving cam 16 about pivot 17 until the desired clearance between disk 15 and cam 16 is obtained. This clearance is shown by the position of disk 15 in phantom in Fig. 1.

The front end of cylinder 9 is then pressed firmly against the work, causing electrode 11, electrode holder 10 and insulating block 18 to move rearwardly against the pressure of holder spring 14 until disk 15 contacts cam 16 as shown in full lines in Fig. 1 and disk 15 assumes a biased position with respect to rod 4 as shown in Fig. 2. This locks disk 15 on rod 4 and prevents any further rearward movement until the pressure on rods 4 is released.

Thus when the forward end of cylinder 9 is placed against the work, electrode 11 and its associated parts, including rods 4 and disk 15, move rearwardly to the position shown in full lines in Fig. 1 and disk 15 locks on rod 4, as shown in Fig. 2.

The weld is then made in the usual manner, pressure being maintained on rods 4 by contact with the work. As electrode 11 is consumed, holder spring 14 feeds the electrode forward until it reaches the limit of its travel, as shown in phantom in Fig. 1. Since the electrode cannot be fed any further, it will then be consumed until it has retreated sufficiently within cylinder 9 to break the welding arc.

The end of cylinder 9 is then removed from contact with the work. This releases the bias on disk 15 and permits rod spring 22 to push the disk forwardly against block 18 as shown in phantom in Fig. 1.

This cycle may be repeated until the entire welding rod is consumed, at which time the guide rods 4 are again moved to their extreme right hand position as shown in Fig. 1, and a new electrode inserted in the usual manner.

Although only one embodiment of this invention has been specifically described, such changes as would be obvious to one skilled in the art may be made without departing from the scope thereof. For example, it is within the contemplation of this invention to provide means for adjusting the tension of holder spring 14 as well as indicating means visible from the outside of the casing to show how much tension has been placed on spring 14. Similarly, indicating means may be placed in such a manner as to clearly show the amount of electrode which will be fed at the end of the apparatus for any given setting of knob 21 and cam 16.

Furthermore the number of guide rods may be varied to suit the particular requirements of a given operation and the guide may take almost any suitable shape.

These and other obvious changes may be made without departing from the spirit of this invention, which is to be broadly construed and not to be limited except by the character of the claims appended hereto.

What is claimed is:

1. Apparatus for feeding welding electrodes comprising a casing, means for gripping said casing, a slidable guide rod extending through the ends of said casing, an insulating block in said casing slidably mounted on said rod, an electrode holder having one end secured to said block and extending through said casing at the end thereof adjacent to said guide rod, means for urging said block toward the end thereof adjacent said guide rod, a slidably mounted stop means for said block on said guide rod, an adjustable stop means on said casing adapted to be contacted by said slidably mounted stop means.

2. Apparatus for feeding welding electrodes according to claim 1 wherein said slidably mounted stop means is adapted to grip said rod and prevent movement thereof until pressure is released therefrom.

3. Apparatus for feeding welding electrodes according to claim 1 wherein said slidably mounted stop means comprises a disk loosely mounted on said rod and urged toward said block.

4. Apparatus for feeding welding electrodes according to claim 2 wherein there is one giude rod on either side of said electrode holder.

5. Apparatus according to claim 2 wherein said slidably mounted stop means comprises a disk urged toward said block.

6. Apparatus according to claim 2 wherein said adjustable stop means comprises a cam controlled from outside the casing and placed in the path of said slidably mounted stop means.

7. Apparatus according to claim 2 wherein said means for urging said block comprises a helical spring between said block and the end of said casing remote from said electrode holder.

8. Apparatus according to claim 2 wherein there is an insulated guide for an electrode near the end of said guide rod.

References Cited in the file of this patent

UNITED STATES PATENTS

| | | |
|---|---|---|
| 2,817,003 | Dusek | Dec. 17, 1957 |
| 2,898,445 | Slizak | Aug. 4, 1959 |
| 2,917,618 | Brennen | Dec. 15, 1959 |